(12) United States Patent
Ashish et al.

(10) Patent No.: US 7,725,750 B2
(45) Date of Patent: May 25, 2010

(54) METHOD OF TRANSITIONING BETWEEN ACTIVE MODE AND POWER-DOWN MODE IN PROCESSOR BASED SYSTEM

(75) Inventors: Mathur Ashish, New Delhi (IN); Vikas Ahuja, Delhi (IN); Batmanabhan Purushothaman, Pondicherry (IN); Anupam Singal, New Delhi (IN); Meenakshi Vasisht, New Delhi (IN)

(73) Assignee: Freescale Semiconductor, Inc., Austin, TX (US)

( * ) Notice: Subject to any disclaimer, the term of this patent is extended or adjusted under 35 U.S.C. 154(b) by 603 days.

(21) Appl. No.: 11/738,531

(22) Filed: Apr. 23, 2007

(65) Prior Publication Data
US 2007/0260794 A1 Nov. 8, 2007

(30) Foreign Application Priority Data
May 1, 2006 (IN) .................................. 1099/06

(51) Int. Cl.
*G06F 1/00* (2006.01)
*G06F 1/32* (2006.01)
*G06F 11/00* (2006.01)

(52) U.S. Cl. ............................ 713/323; 713/320; 714/14
(58) Field of Classification Search .................. 713/323
See application file for complete search history.

(56) References Cited

U.S. PATENT DOCUMENTS

| 5,355,490 A | 10/1994 | Kou |
| 5,386,552 A | 1/1995 | Garney |
| 5,487,181 A * | 1/1996 | Dailey et al. ............... 455/90.2 |
| 5,671,422 A * | 9/1997 | Datta ........................ 710/261 |
| 6,021,500 A * | 2/2000 | Wang et al. ................. 713/320 |
| 6,212,609 B1 | 4/2001 | Abramson et al. |
| 6,336,161 B1 | 1/2002 | Watts |
| 6,393,584 B1 * | 5/2002 | McLaren et al. ............. 714/14 |
| 7,190,187 B2 * | 3/2007 | Hua et al. .................... 326/27 |
| 2002/0162037 A1 | 10/2002 | Woods et al. |
| 2004/0236968 A1 | 11/2004 | Hill |

* cited by examiner

*Primary Examiner*—Suresh K Suryawanshi
(74) *Attorney, Agent, or Firm*—Charles Bergere

(57) ABSTRACT

A method of transitioning between an active mode and a power-down mode in a processor-based system includes saving a state of the active mode, detecting the occurrence of one or more interrupt events during a transition between the active mode and the power-down mode, and responding to the detected interrupt events.

12 Claims, 4 Drawing Sheets

METHOD OF TRANSITIONING BETWEEN ACTIVE MODE AND POWER-DOWN MODE IN PROCESSOR BASED SYSTEM

BACKGROUND OF THE INVENTION

The present invention relates, in general, to power saving in processor-based systems, and more particularly, to a transition between an active mode and a power-down mode in processor-based systems.

Recently, there has been an increase in the demand for power-saving techniques in processor-based systems such as mobile phones, laptop computers, Personal Digital Assistants (PDAs), cameras, and the like. Power gating is a very effective and widely used power saving technique. In power gating, a state of the processor-based system is saved in a memory and the power supply to at least a part of a processor-based system is cut off. The state of the processor-based system can include the state of the processor, the processor pipelines, the processor registers, the processor peripheral registers, the cache registers, the read-only status registers, the cache state registers, the processor memory, and so forth. The state of the processor-based system can be restored from the memory on the detection of a wake-up event, for example, an interrupt event.

One technique for saving the state of the processor-based system includes software-based save-restore. One prior art application of software-based save-restore technique includes using a Basic Input Output System (BIOS) based save-restore, which is further coupled with a higher level save-restore. The higher level save-restore handles special processor modes such as a user mode and a kernel mode. Another prior art application of software-based save-restore technique includes partitioning the memory into isolated and non-isolated regions. Other techniques include scan-based save-restore and balloon circuit-based state retention.

In existing techniques, once a transition between the active mode and the power-down mode entry is initiated, the processor-based system does not respond to interrupt events. These interrupt events are either explicitly masked off or the transition between the active mode and the power-down mode is triggered by a non-maskable interrupt event, and therefore cannot be interrupted.

Most of the above-mentioned techniques also require significant design changes in the processor-based system. The scan-based save-restore requires design changes to provide an interface between the scan chains and the memory. This technique also requires high-speed scan shifting in order to minimize the time taken for saving and restoring. However, high-speed scan shifting can result in a high current drain. The high current drain can cause electro-migration and degrade the reliability of the processor-based system. The balloon circuit-based save-restore requires the creation of new balloon circuit cell libraries for sequential cells and may also require design changes. Balloon cells are larger in size than regular sequential cells and this may also result in area overheads.

Existing software-based save-restore techniques do not respond to interrupt events once the transition between the active mode and the power-down mode is initiated. This causes delays in the response to interrupt events that arrive after the transition between the active mode and the power-down mode is started. The interrupt events also can be lost if the source of the interrupt events is not available by the time the processor-based system enters the active mode. Further, multiple interrupt events can be served in a different order from the one in which they arrived. In addition, there is an energy overhead associated with the transition between the active mode and the power-down mode when the interrupt events that are wake-up category interrupt events arrive during the transition between active and power-down mode. Moreover, these existing software save-restore techniques do not provide a comprehensive technique for restoration of the read-only registers through software, which can result in incomplete state restoration.

BRIEF DESCRIPTION OF THE DRAWINGS

The following detailed description of preferred embodiments of the present invention will be better understood when read in conjunction with the appended drawings. The present invention is illustrated by way of example and not limited by the accompanying figures, in which like references indicate similar elements.

DETAILED DESCRIPTION OF THE PRESENT INVENTION

Figure 1:
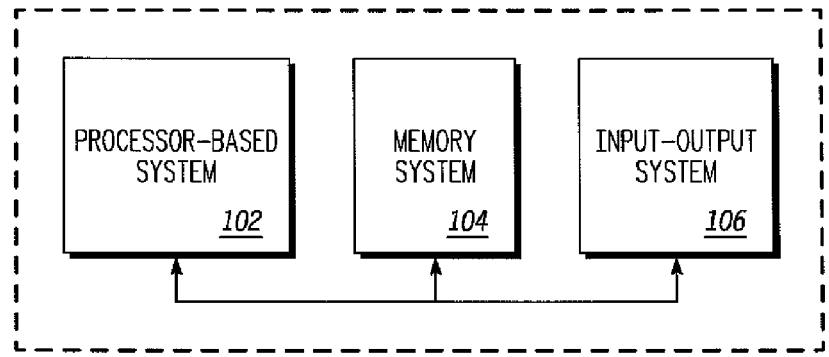
FIG. 1 is a schematic block diagram of an electronic device in accordance with an embodiment of the present invention.

The detailed description in connection with the appended drawings is intended as a description of the presently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

The present invention provides a method of transitioning between an active mode and a power-down mode in a processor-based system. The transitioning is through one or more intermediate states. The method includes saving a state of the active mode, detecting the occurrence of one or more interrupt events during a transition between the active mode and the power-down mode, and responding to a first set of interrupt events from amongst the one or more interrupt events. The first set of interrupt events occurs during the transition from the active mode to the one or more intermediate states.

In another embodiment, the present invention provides a method of transitioning between an active mode and a power-down mode in a processor-based system. The transitioning is through one or more intermediate states. The method includes saving a state of the active mode, detecting the occurrence of one or more interrupt events during the transition between the active mode and the power-down mode, responding to a first set of interrupt events from the one or more interrupt events, and masking a second set of interrupt events from the one or more interrupt events. The method includes unmasking the second set of interrupt events from amongst the one or more interrupt events upon entering the active mode. The first set of interrupt events occurs during the transition from the active mode to the one or more intermediate states. The second set of interrupt events occurs during the transition from the one or more intermediate states to the power-down mode or during the transition from the power-down mode to the active mode.

In yet another embodiment, the present invention provides a processor-based system, which includes a processing module and a memory module. The processing module detects the occurrence of one or more interrupt events during a transition between an active mode and a power-down mode. The processor-based system responds to a first set of interrupt events from the one or more interrupt events. The first set of interrupt events occurs during the transition from the active mode to the one or more intermediate states between the active mode and the power-down mode. The memory module is coupled to the processing module and includes program instructions that are executable by the processing module. The program instructions include detecting the occurrence of the one or more interrupt events during the transition between the active mode and the power-down mode. The program instructions also include responding to the first set of interrupt events from the one or more interrupt events. The first set of interrupt events occurs during the transition from the active mode to the one or more intermediate states.

Embodiments of the present invention provide a method for transitioning between an active mode and a power-down mode in a processor-based system. The method does not require any major hardware design changes, and ensures that the processor-based system responds to interrupt events after a transition between the active and power-down mode entry is initiated. The present invention also ensures that the interrupt events that arrive during the transition from active to power-down mode are not lost without being served. Further, the present invention ensures that interrupt events that arrive during the transition from active to power-down mode are served according to their order of arrival, and restores the read-only registers through software.

Referring now to FIG. 1, an electronic device 100, in accordance with an embodiment of the present invention, is shown. The electronic device 100 may be, for example, a personal computer (PC), a mobile phone, a digital camera, a scanner, an electronic vision system, a vehicle navigation system, a video telephone, an electronic surveillance system, a motion detection system, a data-compression system, a laptop computer, a Personal Digital Assistant (PDA), and the like. The electronic device 100 comprises a processor-based system 102, a memory system 104, and an input-output system 106.

In an embodiment of the present invention, the processor-based system 102, the memory system 104, and the input-output system 106 are coupled to one another. The processor-based system 102 transitions between an active mode and a power-down mode through one or more intermediate states. During the active mode, the processor-based system 102 is in a powered-up state. During the power-down mode, the power supply to at least a part of the processor-based system 102 is cut off. The memory system 104 may be, for example, a magnetic memory, an optical memory, a Read Only Memory (ROM), a Random Access Memory (RAM), a flash memory, and so forth. In an embodiment of the present invention, a part of the memory system 104 is in a powered-up state during the power-down mode of the processor-based system 102. The input-output system 106 may be, for example, Input/Output devices and peripheral devices such as speakers, microphones, display devices, touch screens, printers, serial ports, parallel ports, keyboards, and keypad controllers, among other things.

Figure 2:
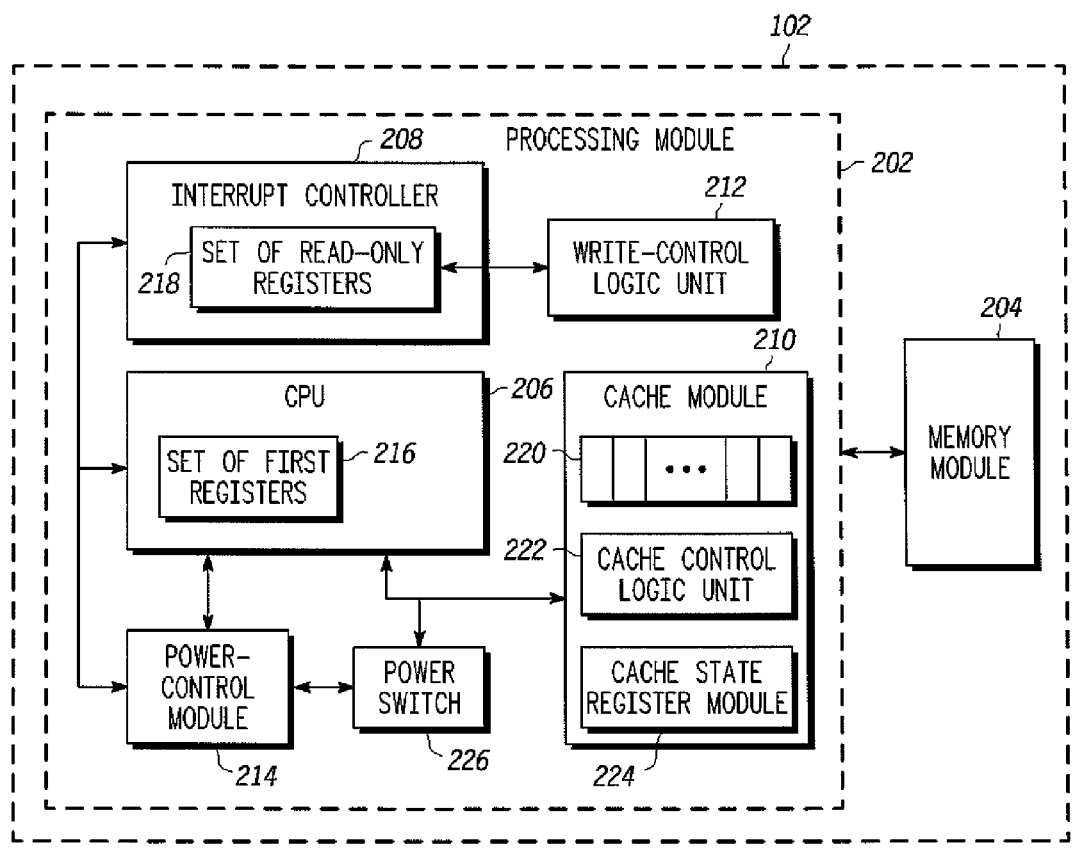
FIG. 2 is a block diagram of a processor-based system in accordance with an embodiment of the present invention.

Referring now to FIG. 2, a block diagram of the processor-based system 102, in accordance with an embodiment of the present invention, is shown. The processor-based system 102 includes a processing module 202 and a memory module 204. The processing module 202 detects the occurrence of one or more interrupt events during the transition between the active mode and the power-down mode of the processor-based system 102. The processing module 202 responds to a first set of interrupt events from the one or more interrupt events. The first set of interrupt events occurs during the transition from the active mode to the one or more intermediate states. The one or more intermediate states are between the active mode and the power-down mode. The memory module 204 is coupled to the processing module 202. Examples of the memory module 204 include a Dynamic Random Access Memory (DRAM), a Static Random Access Memory (SRAM), an Erasable Programmable Read Only Memory (EPROM), an Electrically Erasable Programmable Read Only Memory (EEPROM), a flash memory, and so forth.

In an embodiment of the present invention, the memory module 204 retains the state of the active mode of the processor-based system 102 during the power-down mode of the processor-based system 102. In another embodiment of the present invention, the memory module 204 includes a number of memory sub-modules. In such an embodiment, one or more of the memory sub-modules of the memory module 204 are in a powered-up state during the power-down mode of the processor-based system 102. The one or more memory sub-modules store the state of the active mode of the processor-based system 102 during the power-down mode of the processor-based system 102. In an embodiment of the present invention, the memory module 204 includes program instructions that are executable by the processing module 202, and data read or written by the processing module 202. The program instructions include instructions for detecting the occurrence of the one or more interrupt events during the transition between the active mode and the power-down mode. The program instructions also include instructions for responding to the first set of interrupt events from the one or more interrupt events.

Further, the processing module 202 includes a central processing unit (CPU) 206, an interrupt controller 208, a cache module 210, a write-control logic unit 212, and a power-control module 214. The CPU 206 includes a set of first registers 216. In an embodiment of the present invention, the CPU 206 also includes a set of read-only registers, for example, CPU status registers (SRs).

The interrupt controller 208 is coupled to the CPU 206 and detects the occurrence of the one or more interrupt events. In an embodiment of the present invention, the interrupt controller 208 includes a set of read-only registers 218, for example interrupt pending registers (IPRs). Typically, any of the interrupt controller 208, the cache module 210, and the power-control module 214 can have a set of read-only registers. In an embodiment, the set of read-only registers include at least one read-only bit. The cache module 210 includes a cache memory array 220, a cache control logic unit 222, and a cache state register module 224. The cache memory array 220 includes data and instruction caches. The cache state register module 224 includes a plurality of cache state registers for storing the state of the cache memory array 220. Each of the plurality of cache state registers can include attributes, for example, a valid flag, a dirty flag, data replacement information, and an address tag. In an embodiment of the present invention, the write-control logic unit 212 is coupled to the set of read-only registers 218. In another embodiment, the write-control logic unit 212 may be coupled to a read-only register from the set of read-only registers of any of the CPU 206, the cache module 210, or the power-control module 214. In an embodiment of the present invention, the write-control logic unit 212 enables software restoration of the set of read-only registers 218, for example, the IPRs. An interrupt pending register (IPR) stores information pertaining to the pending interrupts of the processor-based system 102. The pending interrupts are served by the processor-based system 102. The IPR can also include masked interrupts, which remain pending until they are unmasked. The masked pending interrupts in the IPR can get lost in the transition from the active mode to the power-down mode if the state of the IPR is not saved and restored.

Functions of the power-control module 214 include controlling power supply to the processor-based system 102, detecting the occurrence of wake-up events, and so forth. In an embodiment of the present invention, the functions of the power-control module 214 can be distributed to multiple modules. In an embodiment of the present invention, the processing module 202 includes a power switch 226, which is coupled to the power-control module 214. The power switch 226 controls the supply of power to the processor-based system 102. In an embodiment of the present invention, the power-control module 214 is coupled to the power switch 226. The power switch 226 switches off the power supply to the processing module 202 when it receives a signal to switch off power from the power-control module 214. In an embodiment of the present invention, the power-control module 214 is present outside the processor module 202.

Figure 3:
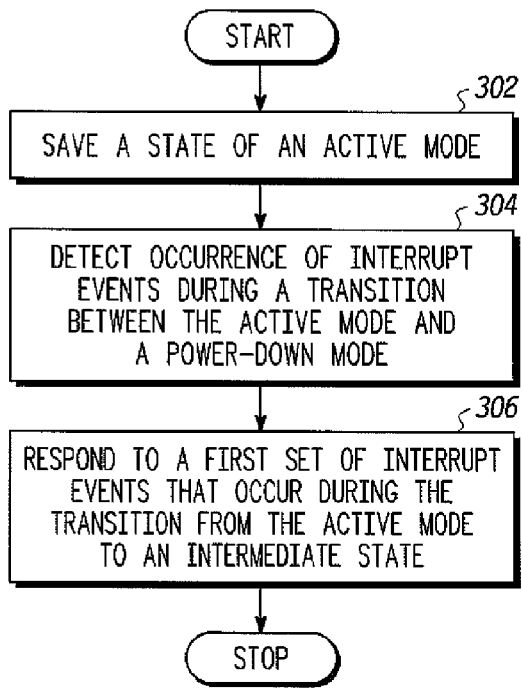
FIG. 3 is a flowchart depicting a method of transitioning between an active mode and a power-down mode in a processor-based system in accordance with an embodiment of the present invention.

FIG. 3 is a flowchart, depicting a method of transitioning between the active mode and the power-down mode of the processor-based system 102, in accordance with an embodiment of the present invention. In an embodiment of the present invention, the method of transitioning between the active mode and the power-down mode includes a method of transitioning from the active mode to the power-down mode. The method of transitioning between the active mode and the power-down mode further includes a method of transitioning from the power-down mode to the active mode.

At step 302, the state of the active mode of the processor-based system 102 is saved. In an embodiment of the present invention, saving the state of the active mode of the processor-based system 102 is triggered by the detection of an idle period. Examples of the idle period can be a period during which the processor-based system 102 does not receive any input from a user for a pre-defined time interval, a specified period during which there is no input stimulus, such as, a voice call, a message in a cell phone and the like, arriving from the Input-Output system. In an embodiment of the present invention, saving the state of the active mode of the processor-based system 102 includes storing the state of the processor-based system 102 in a memory module, for example, the memory module 204 that can retain the data during the power-down mode. The state of the processor-based system 102 can include the state of the CPU, for example, the CPU 206; the processor pipelines; the processor registers, for example, the set of first registers 216; the processor peripheral registers, the cache registers, the read-only status registers, the cache state registers, the processor memory, and so forth. The transition between the active mode and the power-down mode of the processor-based system 102 is through one or more intermediate states. In an embodiment of the present invention, one of the intermediate states is a clock-gated idle state. In the clock-gated idle state, one or more clocks to a portion of the processor-based system 102 are shut down and the processor-based system 102 is not powered off.

At step 304, the processor-based system 102 detects the occurrence of interrupt events during the transition between the active and power-down modes. In an embodiment of the present invention, the interrupt event is detected, based on the value of an INT_DET register. In an embodiment of the present invention, the INT_DET register is present in the interrupt controller 208. In another embodiment of the present invention, the INT_DET register is present in the power-control module 214. The INT_DET register is a hardware register that is readable through software and is set on the occurrence of an interrupt event. In an embodiment of the present invention, during the transition between the active mode and the power-down mode, one or more checks can be performed on the INT_DET register. In an embodiment of the present invention, the one or more checks on the INT_DET register can be hardware checks. In another embodiment of the present invention, the one or more checks on the INT_DET register can be software checks. In an embodiment of the present invention, the power-control module 214 aborts the transition to the power-down mode when the INT_DET register is set, to ensure that the processor-based system 102 is not powered off with a corrupt saved state. The corrupt saved state does not represent the state of the processor-based system 102 prior to the initiation of the transition from the active mode to the power-down mode. A hardware check on the INT_DET register by the power-control module 214 is performed because the software checks on INT_DET register are not sufficient to manage possible race conditions between setting of the INT_DET register upon occurrence of an interrupt event and a software check on the INT_DET register. This race condition may lead to missing out on the set state of the INT_DET register.

At step 306, the processor-based system 102 responds to a first set of interrupt events. In an embodiment of the present invention, the processor-based system 102 responds to the INT_DET register SET condition. The first set of interrupt events occurs during the transition from the active mode to an intermediate state of the one or more intermediate states. In an embodiment of the present invention, responding to the INT_DET register SET condition includes restarting the transition from the active mode to the power-down mode, restarting the transition from the active mode to the power-down mode after a predefined time interval or postponing the transition from the active mode to the power-down mode till the next idle period. In an embodiment of the present invention, the interrupt events are masked during the transition between the intermediate state and the power-down mode of the processor-based system 102.

Figure 4:
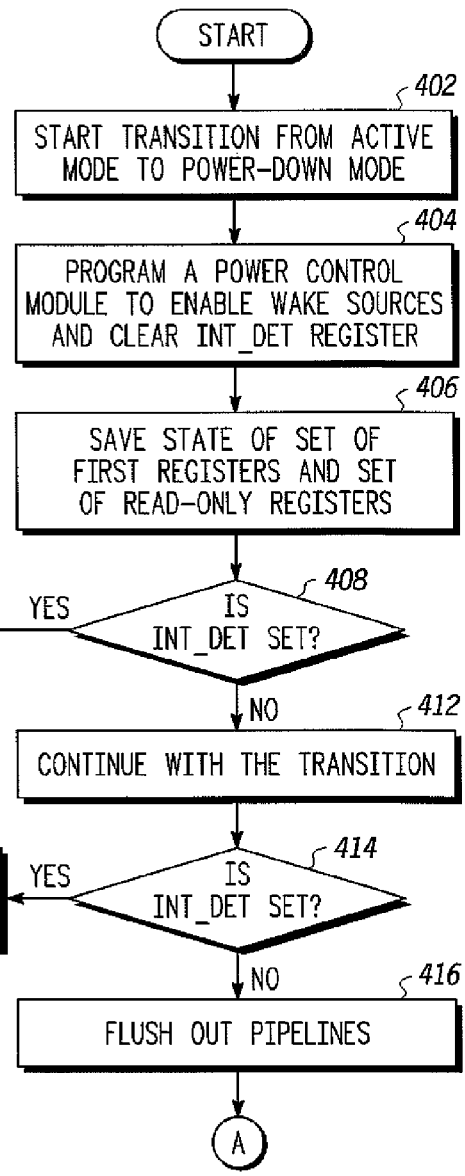
FIGS. 4 and 5 show a flowchart depicting a method of transitioning between the active mode and the power-down mode of a processor-based system in accordance with another embodiment of the present invention.
Figure 5:
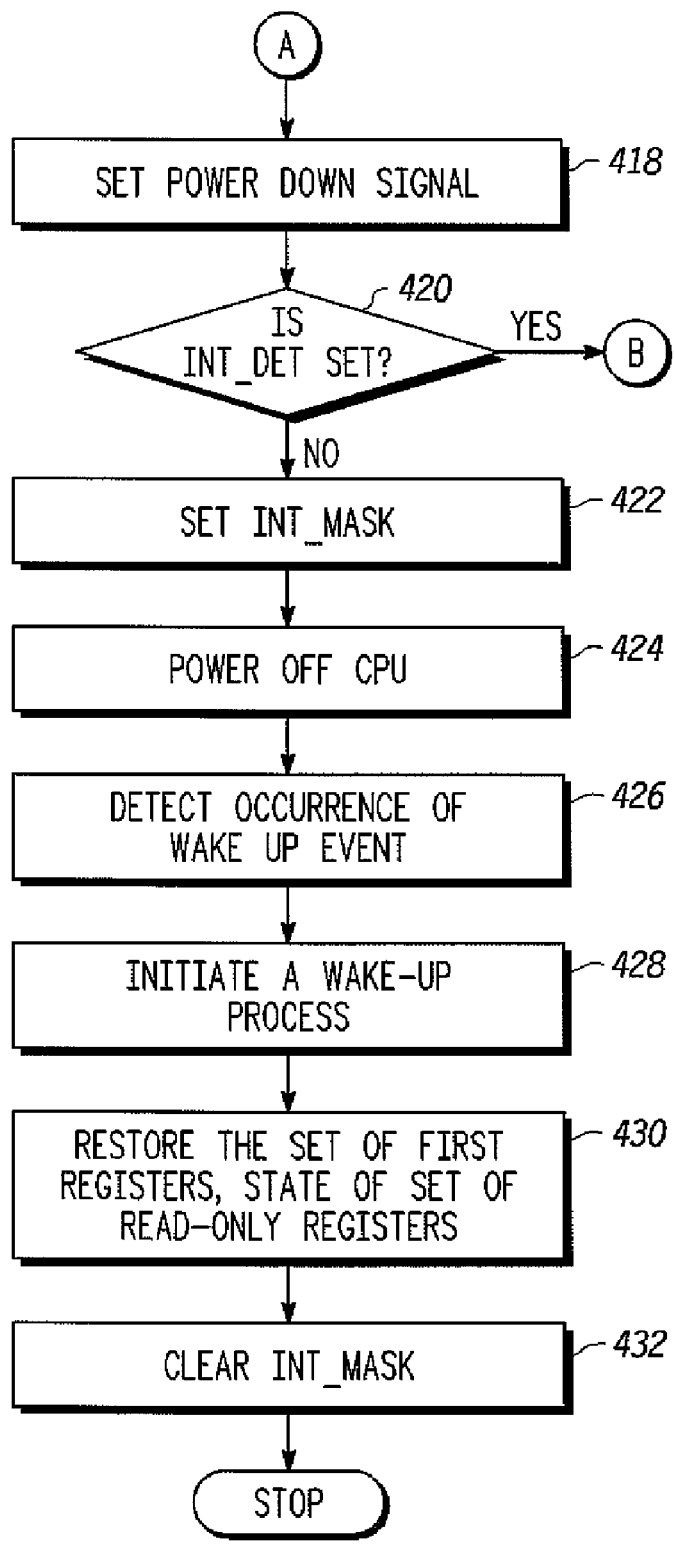

FIGS. 4 and 5 show a flowchart depicting a method of transitioning between the active mode and power-down mode of the processor-based system 102, in accordance with another embodiment of the present invention. In an embodiment of the present invention, the transition between the active mode and the power-down mode includes a transition from the active mode to the power-down mode through the one or more intermediate states. Further, the transition between the active mode and the power-down mode also includes a transition from the power-down mode to the active mode. At step 402, the processor-based system 102 starts the transition from the active mode to the power-down mode. The transition from the active mode to the power-down mode is through the one or more intermediate states. In an embodiment of the present invention, the transition is triggered on the detection of the idle period. In an embodiment of the present invention, the power supply to at least a part of the processor-based system 102 is cut off during the power-down mode of the processor-based system 102.

At step 404, the processor-based system 102 programs the power-control module 214 to enable wake sources. By enabling these wake sources, the processor-based system 102 determines one or more wake up events which can initiate the transition from the power-down mode to the active mode of the processor-based-system 102. In an embodiment of the present invention, these events may be derived from sources internal to the electronic device 100. In another embodiment of the present invention, these events may be derived from sources external to the electronic device 100. Examples of the wake up events include interrupts, debug requests and so forth. The processor-based system 102 clears the INT_DET register. In an embodiment of the present invention, the interrupt events occurring during the transition from the active mode to the power-down mode sets the INT_DET register.

At step 406, the processor-based system 102 saves the state of the set of first registers 216 and the set of read-only registers 218. In an embodiment of the present invention, the set of read-only registers 218 is made 'software-writable' by write-control logic unit 212. In an embodiment of the present invention, the write-control logic unit 212 sets a restore-write control register. The restore-write control register is programmable through software and enables software restoration of the set of read-only registers 218. In an embodiment of the present invention, the restore-write control register is a single register. In another embodiment of the present invention, the restore-write control register corresponds to a single read-only register or a group of read-only registers. The write-control logic unit 212 provides the logic for software restoration of one or more read-only registers of the set of read-only registers 218 in addition to an already existing status-event write logic associated with the read-only registers. In an embodiment of the present invention, the write-control logic unit 212 uses a priority scheme when a software restore-write and a status-event write occur simultaneously. In this embodiment, the priority scheme can be based on the desired functionality of the read-only register in context of the overall requirement of the processor-based system 102. In an embodiment of the present invention, a status-event write occurs during the transition from the power-down mode to the active mode and prior to software restore. In this embodiment, the priority scheme can be based on the logical significance of a saved value of the read-only register 218 compared to the status-event write value that was written in the status-event write during the transition from the power-down mode to the active mode. In an embodiment of the present invention, the priority scheme depends on the desired functionality of the read-only register in context of the overall requirements of the processor-based system 102.

In an embodiment of the present invention, saving the state of the active mode also includes saving the state of the plurality of cache state registers when the plurality of cache state registers are to be powered off during the power-down mode and the cache memory array 220 is to remain powered up. In an embodiment of the present invention, the plurality of cache state registers is software-readable and software-writable through a cache restore-write control register. The cache restore-write control register can be programmed through software. This enables saving and restoring the state of the plurality of cache state registers through software. In an embodiment of the present invention, the cache module 210 is flushed out when it is to be powered-off during the power-down mode. This ensures that any dirty data is copied to main memory and is not lost when the cache module 210 is powered off. In another embodiment of the present invention, a portion of the cache module 210 remains powered-on during the power-down mode of the processor-based system 102. In an embodiment of the present invention, the cache module 210 is flushed and the cache module 210 is powered-off. In another embodiment of the present invention, state of cache state registers is saved. In this embodiment, the cache control logic unit 222 and the cache state register module 224 are powered-off, but the cache memory array 220 remains powered-up and the cache memory array 220 is not flushed.

At step 408, the processor-based system 102 checks the state of the INT_DET register. Interrupt events occurring during the transition between the active mode and the power-down mode of the processor-based system 102 sets the INT_DET register. The state of the INT_DET register is checked through software. At step 410, the processor-based system 102 responds to the first set of interrupt events, when the INT_DET register is set. The processor-based system 102 continues with the transition between the active mode and the power-down mode if it is determined that the INT_DET register is not set.

At step 410, the processor-based system 102 responds to the first set of interrupt events. In an embodiment of the present invention, the processor-based system 102 responds to the SET condition of INT_DET register. In this embodiment, responding to the SET condition of INT_DET register includes restarting the transition from the active mode to the power-down mode, or restarting the transition from the active mode to the power-down mode after a predefined time interval or postponing transition from the active mode to the power-down mode till the next idle period.

At step 412, the processor continues with the transition between the active mode and the power-down mode. In an embodiment of the present invention, continuing the transition includes saving the state of one or more processor peripheral registers, one or more cache configuration registers, processor embedded memory or a part of the processor memory which is to be powered off, and the like.

At step 414, the processor-based system 102 checks the state of the INT_DET register. In an embodiment of the present invention, the state of the INT_DET register is checked after the states of the set of first registers 216 and the set of read-only registers 218 are saved. In an embodiment of the present invention, after determining the state of the INT_DET register, a low-power mode entry signal is sent by the CPU 206 to the interrupt controller 208, the power-control module 214 and the cache module 210. The low-power mode entry signal starts the transition of the processor-based system 102 to a low-power state, for example, the clock gated idle state. The low-power state is an intermediate state from the one or more intermediate states.

At step 416, the processor-based system 102 halts the CPU 206 and flushes out a plurality of pipelines, for example, instruction pipelines of the processor-based system 102. In an embodiment of the present invention, all buffered up transactions, for example, buffered read operations and buffered write operations of the processor-based system 102 are completed. In an embodiment of the present invention, when the interrupt event is detected by the set state of the INT_DET register during the flushing out of the plurality of pipelines, the processor-based system 102 aborts the transition from the active mode to the power-down mode. In an embodiment of the present invention, after aborting the transition from the active mode to the power-down mode, the processor-based system 102 responds to the interrupt event. In an embodiment of the present invention, the response to the interrupt event includes serving the interrupt event. In this embodiment, after serving the interrupt event, the processor-based system 102 restarts the transition from the active mode to the power-down mode. In another embodiment of the present invention, the processor-based system 102 restarts the transition from the active mode to the power-down mode after a predefined time interval. In yet another embodiment, the processor-based system 102, postpones the transition from the active mode to the power-down mode till the next idle period.

At step 418, the CPU 206 sends a power-down signal to the power-control module 214 when no interrupt events occur during the flushing out of the plurality of pipelines. The power-down signal enables the power-control module 214 to power-off the CPU 206. In an embodiment of the present invention, the power-down signal is a signal to the power-control module 214, to power-off the CPU 206, the interrupt controller 208, and the cache module 210. In another embodiment of the present invention, the interrupt controller 208 is not powered-off during the power-down mode of the processor-based system 102. In an embodiment of the present invention, the processor-based system 102 attains a clock-gated idle state after asserting the power-down signal to the power-control module 214.

At step 420, the power-control module 214 checks the state of the INT_DET register after receiving the power-down signal from the CPU 206. If the state of the INT_DET register is set, then the transition from the active mode to the power-down mode is aborted and the power control module 214 does not power off the processor-based system 102. The processor-based system 102 responds to the first set of interrupt events. The interrupt event occurs in the duration when the power-down signal is sent by the CPU 206 to the power-control module 214 till the INT_MASK register is set. The INT_MASK register is a hardware register. The interrupt events are masked when the state of the INT_MASK register is set. Typically, there are three time windows with regard to handling of interrupts. The first time window is from start of the transition from the active mode to the power-down mode, till the beginning of the pipeline flushing. In this time window, interrupt events are detected by the software check of the INT_DET register. The second time window is during flushing of the plurality of pipelines. Interrupts in the second time window cause the processor system to abort entry into the intermediate state, for example the clock gated idle state. If an interrupt occurs in the second time window, the power down signal is not sent. The third time window is after the power-down signal is sent and till INT_MASK is set. Response to interrupts in this window is by hardware check of INT_DET register by the power control module 214. In another embodiment of the present invention, responding to the first set of interrupt events includes restarting the transition from the active mode to the power-down mode or, restarting the transition from the active mode to the power-down mode after a predefined time interval or postponing the power down mode transition till the next idle period, based on the occurrence of an interrupt event of the first set of interrupt events. In another embodiment of the present invention, a wake-up process is initiated for the transition from the power-down mode to the active mode of the processor-based system 102 by the power-control module 214.

At step 422, the second set of interrupt events from the one or more interrupt events are masked. The second set of interrupt events occurs during the transition between the one or more intermediate states and the power-down mode. In an embodiment of the present invention, the one or more interrupt events are masked to ensure that the interrupt events that occur during the powering off the CPU 206 do not change the state of the processor-based system 102. In an embodiment of the present invention, the power-control module 214 sets the INT_MASK register. The interrupt events are masked when the state of the INT_MASK register is set by the power-control module 214. In an embodiment of the present invention, when the state of the INT_MASK register is set, no wake-up events can be detected by the processor-based system 102 till the processor-based system 102 attains the power-down mode. In yet another embodiment of the present invention, when the INT_MASK register is set, no wake-up events can be detected by the processor-based system 102 till it completes the transition to the active mode from the power-down mode.

At step 424, the CPU 206 is powered off by the power-control module 214. In an embodiment of the present invention, on receiving the power-down signal, the power-control module 214 powers off the CPU 206. In another embodiment of the present invention, the power-control module 214 powers off the processor-based system 102. In an embodiment of the present invention, the power switch 226 switches off the power supply to the processing module 202 when it receives a signal to switch off power from the power-control module 214. After switching off of the power supply to the processing module 202, the processor-based system 102 attains the power-down mode. In an embodiment of the present invention, instead of sending the power-down signal, the CPU 206 sets a register POWER_DWN_EN in the power-control module 214. When the register POWER_DWN_EN is set, the power-control module 214 powers off the processor-based system 102. In this embodiment, the CPU 206 sends a STOP_ACK signal to the power-control module 214 after flushing out the plurality of pipelines. The STOP_ACK signal is an assertion by the CPU 206 to enter the clock-gated idle state. The power-control module 214, on receiving the STOP_ACK, powers off the processor-based system 102 when the state of the POWER_DWN_EN register is SET and the state of the INT_DET register is not set.

In an embodiment of the present invention, the processor-based system 102 saves its state of the active mode, based on energy overhead associated with the transition between the active mode and the power-down mode of the processor-based system 102. Based on the energy overhead, the processor-based system 102 saves the state of one or more registers of the set of first registers 216, the set of read-only registers 218, and so forth. In an embodiment of the present invention, the energy overhead can be used to determine a break-even time ($T_{break\_even}$) of the power-down mode. The $T_{break\_even}$ is the minimum amount of time during which the processor-based system 102 must remain in a power-down mode to save power. The processor-based system 102 saves power during the power-down mode, when the time during which the processor-based system 102 remains in the power-down mode ($T_{poff}$) is more than $T_{break\_even}$.

$$T_{poff} > T_{break\_even}; \qquad (1)$$

Where, $$(T_{break\_even}) = (E_{Total})/(P_{pon\_idle} - P_{poff}); \text{ and} \qquad (2)$$

$$(E_{Total}) = (E_{save} + E_{turn\_off} + E_{turn\_on} + E_{restore} + E_{cold}). \qquad (3)$$

Where, $P_{pon\_idle}$ is the average power of the processor-based system 102 in the intermediate state, for example, a clock-gated idle state;

$P_{poff}$ is the average power of the power-down mode, which corresponds to the powered-on modules of the processor-based system 102 during the power-down mode;

$E_{save}$ is the energy spent during the transition from the active to the power-down mode, including the energy spent in saving the state of the processor-based system 102;

$E_{turn\_off}$ is the energy spent on turning off the power, caused by the discharge of the capacitors and the energy consumption in other components associated with turning the power off, such as, the power switch 226, and the power-control module 214;

$E_{turn\_on}$ is the energy spent on turning on the power, resulting from the charging of the capacitors and energy consumption in other components associated with turning the power on, such as, power switch 226, and the power-control module 214;

$E_{restore}$ is the energy spent in running the transition from the power-down mode to the active mode including the energy spent in restoring the state of the processor based system 102; and $E_{cold}$ is the energy overhead of the cold start misses in the cache memory array 220, when the cache memory array 220 is powered off during the power-down mode.

In an embodiment of the present invention, the processor-based system 102 does not transition from the active mode to the power down mode when the expected time during which the processor-based system 102 has to remain in the power-down mode ($T_{poff}$) is determined to be less than $T_{break\_even}$. In this embodiment the processor-based system 102 can transition from the active mode to the one or more intermediate states.

At step 426, the processor-based system 102 detects the occurrence of at least one wake-up event. Examples of the wake-up event include an interrupt event, amongst others. In an embodiment of the present invention, the interrupt controller 208 is not powered off during the power-down mode of the processor-based system 102. In this embodiment, the wake-up event is detected by the interrupt controller 208. In another embodiment of the present invention, the interrupt controller 208 is powered off during the power-down mode. In this embodiment, the power-control module 214 detects the wake-up event. In an embodiment of the present invention, after detecting the occurrence of at least one wake-up event, the processor-based system 102 starts the transition from the power-down mode to the active mode. In this embodiment, the processor-based system 102 restores the state of the CPU 206, the processor registers, the processor peripheral registers, the cache registers, the processor memory, and so forth.

At step 428, the power-control module 214 initiates the wake-up process for the processor-based system 102. In an embodiment of the present invention, the wake-up process includes reconstructing the power supply to the processor-based system 102 by the power-control module 214 on detecting the wake-up event. In another embodiment of the present invention, the power-control module 214 restarts clocks, asserts the CPU 206 reset, and provides a boot-vector location to the CPU 206. The boot vector points to the location of a restore routine. The restore routine includes a set of program instructions for transitioning the processor-based system 102 to the active mode from the power-down mode. In another embodiment of the present invention, the interrupt controller 208 is powered off during the power-down mode. In an embodiment of the present invention, a wake-up logic unit is implemented on the power-control module 214. The wake-up logic unit includes one or more programmable registers corresponding to the one or more wake sources. When any one of the programmable registers indicates the occurrence of its corresponding wake-up source event, the power-control module 214 initiates the wake-up process for the processor-based system 102.

At step 430, the processor-based system 102 restores the state of the set of first registers 216 and the state of the set of read-only registers 218. In an embodiment of the present invention, restoring the state of the set of read-only registers 218 includes sending a write-control signal. The write-control signal writes to the restore-write control register. The write-control signal enables a software-restore write operation, which restores the state of the set of read-only registers 218. In an embodiment of the present invention, the state of the set of read-only registers 218 is restored after the restore write-control register is set. After restoring the state of the set of read-only registers 218, the restore write-control register is cleared. In yet another embodiment of the present invention, the plurality of cache state registers is restored while the restore write-control register is set. In this embodiment, the cache memory array 220 remains powered up while the cache control logic 222 and the cache state register module 224 are powered off after the cache state registers are saved. In this embodiment, the processor-based system 102 ensures that the restore routine does not alter the state of the cache during restoration by accessing the restore routine instructions and data from a non-cacheable memory. It should be noted that the cache array itself is never save-restored; the cache arrays either are powered off in which case the cache is flushed or the cache arrays remain powered up in which case the cache state registers are save restored because the cache state registers are powered off during power down mode.

At step 432, the processing module 202 clears the INT_MASK register after the processor-based system 102 attains the active mode. In another embodiment, the state of the INT_MASK is cleared by a software write to the INT_MASK register. The INT_MASK register, when set, ensures that the interrupt events are masked during the transition from the power-down to the active mode. This masking of the interrupt events is required to ensure the state restoration. In an embodiment of the present invention, the processor-based system 102 unmasks the second set of interrupt events on attaining the active mode. In an embodiment of the present invention, the processor-based system 102 has isolation logic to safe state a power-up domain from a power-off domain. The power-up domain includes the one or more modules that remain powered on during the power-down state of the processor-based system 102. The powered-off domain includes one or more modules that are powered off during the power-down sate of the processor-based system 102.

In an embodiment of the present invention, the processor-based system 102 can respond to interrupt events that occur before processor-based system attains any of the one or more intermediate states during the transition from the active mode to the power-down mode. For example, the processor-based system 102 starts the transition from the active mode to the power-down mode. Before flushing out the plurality of pipelines, the processor-based system 102 performs the software check on the INT_DET register. If the INT_DET register is not set, the processor-based system 102 masks the interrupt events by setting the INT_MASK. The processor-based system 102 then flushes the plurality of pipelines and asserts the PWR_DWN signal to the power-control module 214. The power-control module 214 powers off the processor-based system 102. In this embodiment, the power-control module 214 does not check the state of the INT_DET register before it powers off the CPU 206, since the interrupt events are already masked. In another embodiment of the present invention, the processor-based system 102 masks all interrupt events occurring during the transition from the active mode to the power-down mode. In yet another embodiment of the present invention, the processor-based system 102 does not mask the interrupt events occurring during the transition from the active mode to the power-down mode.

Figure 6:
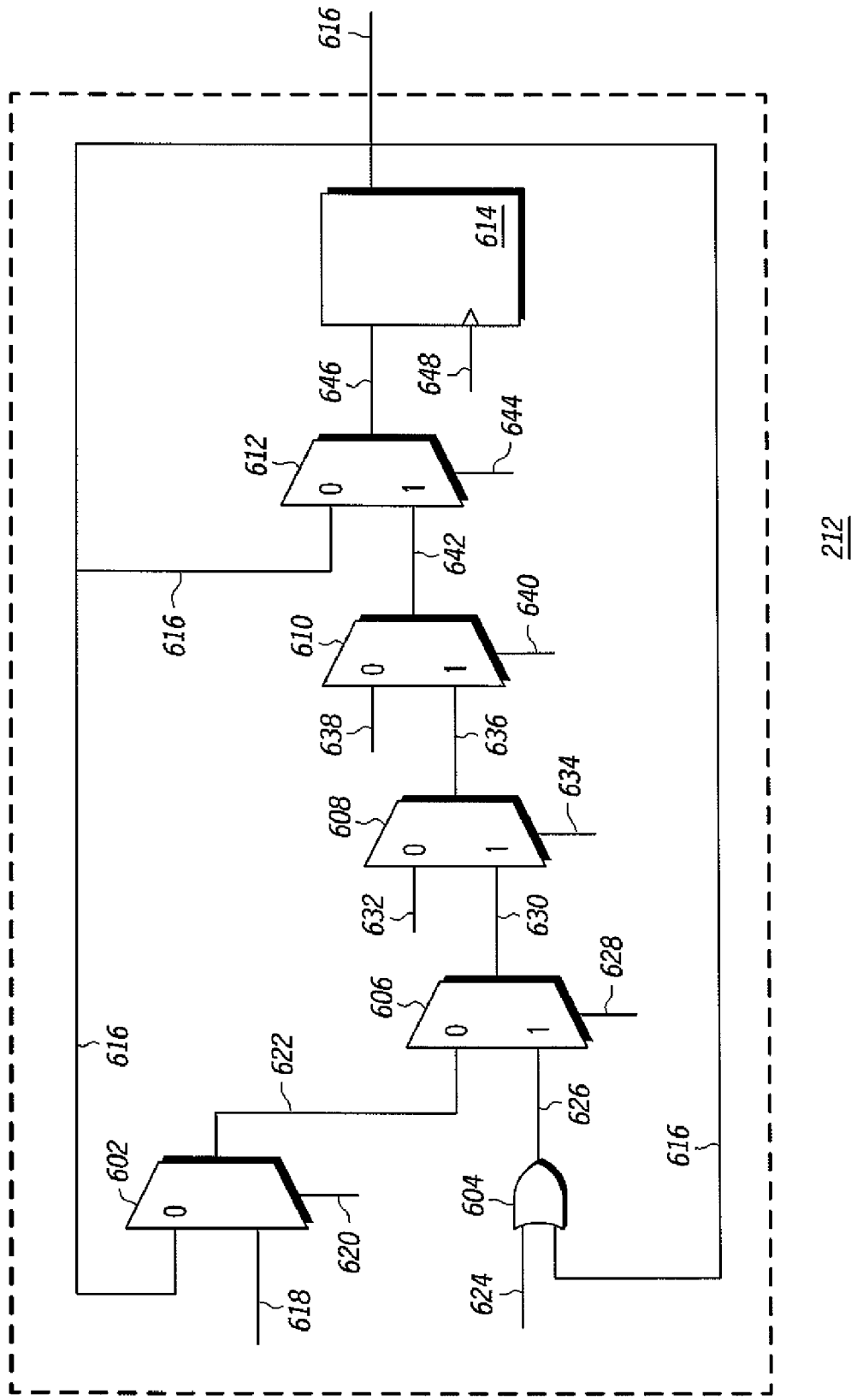
FIG. 6 is a block diagram of a write-control logic unit in accordance with an embodiment of the present invention.

FIG. 6 is a block diagram of a write-control logic unit 212, in accordance with an embodiment of the present invention. The write-control logic unit 212 enables the software restoration of the set of read-only registers 218. In an embodiment of the present invention, the write-control logic unit 212 enables the software restoration of an IPR. The IPR is a read-only register, with only a write HIGH value to clear type of software-write and a LOW value software-write does not affect the contents of the IPR. In an embodiment of the present invention, the function of the IPR in its normal functional mode includes sampling the value of an interrupt line, when the interrupt events are programmed to be level-triggered. The interrupt line carries signals indicating occurrences of interrupt events. In another embodiment of the present invention, the IPR is set, based on a desired edge, for example, a positive edge or a negative edge on the interrupt line when the interrupt event is programmed to be edge-triggered. Once the IPR is set for edge-triggered interrupt events, it is cleared by writing a HIGH value to the IPR.

In this embodiment, the write-control logic unit 212 includes a multiplexer 602, an OR gate 604, a multiplexer 606, a multiplexer 608, a multiplexer 610, a multiplexer 612, and a flip-flop 614. The multiplexer 602 includes a signal line 616 and a signal line 618 for inputs, a signal line 620 for selection, and a signal line 622 for output. The signal line 616 provides the signal value of the IPR to the multiplexer 602. The signal line 620 provides a signal value based on the software-write value to the multiplexer 602 such that signal value at the signal line 620 has HIGH value when the software-write value has a HIGH value. The OR gate 604 includes the signal line 616 and a signal line 624 for inputs, and a signal line 626 for output. The signal line 616 provides the signal value of IPR to the OR gate 604. The signal line 624 provides the software-write value to the OR gate 604. The multiplexer 606 includes the signal line 622 and the signal line 626 for inputs, a signal line 628 for selection, and a signal line 630 for output. The signal line 628 provides a restore-write enable signal to the multiplexer 606, where restore-write enable signal has a HIGH value when the restore-write control setting is done in the write-control logic unit 212. The multiplexer 608 includes the signal line 630 and the signal line 632 for inputs, a signal line 634 for selection, and a signal line 636 for output. The signal line 634 provides an edge-detection signal to the multiplexer 608, which has a HIGH value when a programmed edge is detected. The multiplexer 610 includes the signal line 636 and a signal line 638 for inputs, a signal line 640 for selection, and a signal line 642 for output. The signal line 638 provides a sampled-interrupt-level signal to the multiplexer 610. The signal line 640 provides an edge-configure signal to the multiplexer 610. The multiplexer 612 includes the signal line 616 and the signal line 642 for inputs, a signal line 644 for selection, and a signal line 646 for output. The signal line 644 provides the logically ORed value of the level configuration of the interrupt signal, the edge-detection signal, and a software-write-enabled signal to the multiplexer 612. The logically ORed value ensures that the signal line 644 has a HIGH value when at least one of the level configuration of the interrupt signal, the edge-detection signal, and the software-write-enabled signal has a HIGH value. The flip-flop 614 includes the signal line 646 for inputs, a signal line 648 for a clock signal input, and the signal line 616 for output.

In an embodiment of the present invention, a software-restore path is provided for software restoration of the IPR. In another embodiment of the present invention, no software-restore path exists, when the interrupt signals are programmed to be level-triggered. This can be attributed to the fact that level-triggered interrupt sources should remain asserted until they are serviced. Therefore, save-restore is not required. A hardware write for these level-triggered interrupt sources provides the sampled interrupt level to be written to the IPR through the signal line 638.

In another embodiment of the present invention, the interrupt event sources are edge-triggered. In this embodiment, a HIGH value is written on the IPR when an edge of the interrupt event is detected. The edge of the interrupt event is indicated by a HIGH value of the edge-detection signal on the signal line 634 and the signal line 644.

In another embodiment, when a software-write is detected, it is determined whether the software-write is for software-restore or a non-restore write. Typically, a software-write is detected by a HIGH value of the software-write-enabled signal at the signal line 644. In an embodiment of the present invention, a saved value of the IPR is logically ORed with the present value of the IPR, is written to the IPR when the software-write is for software restore. The software-write for software restore is determined by a HIGH value of the restore-write-enable signal at the signal line 628. This ensures that a HIGH value in the IPR, set by an edge-triggered interrupt event, is not lost when the saved value of the IPR is LOW. The edge-triggered interrupt event is detected before restoring the state of the IPR, during the transition from the power-down mode to the active mode. In another embodiment of the present invention, a LOW value is written to the IPR when the software-write is for a non-restore write, and the software-write signal has a HIGH value.

In an embodiment of the present invention, at the multiplexer 612, the IPR is re-circulated when the interrupt is edge triggered, the edge-detection signal has a LOW value, and no software-write condition is detected. Otherwise, the IPR is written with the signal value on the signal line 642. In another embodiment of the present invention, at the multiplexer 610, the interrupt is level triggered and the value of the sampled interrupt line is written into the IPR. In another embodiment, when the interrupt is edge triggered, the IPR is written with the output of the multiplexer 608. In an embodiment of the present invention, at the multiplexer 608, an edge of the interrupt signal is detected by a HIGH value at the signal line 634. In this embodiment, the signal line 636 gets a HIGH value. If no edge of the interrupt signal is detected, the value on the signal line 630 is written to the IPR. In an embodiment of the present invention, at the multiplexer 606, the restore value ORed with present value of IPR is written to IPR when the software-write for restore is detected by a HIGH value at the signal line 628. Else IPR is written with the output of the multiplexer 602 when software-write is a non-restore write. In an embodiment of the present invention, at the multiplexer 602, a LOW value is written to the IPR when software-write with HIGH value is detected by a HIGH value at the signal line 620, else the value of the IPR is re-circulated.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method of transitioning between an active mode and a power-down mode in a processor-based system through one or more intermediate states, the method comprising:

saving a state of the active mode, including saving the state of a set of first registers of the processor-based system, and saving the state of a set of read-only registers of the processor-based system;

detecting occurrence of one or more interrupt events during a transition between the active mode and the power-down mode;

responding to a first set of interrupt events from amongst the one or more interrupt events, wherein the first set of interrupt events occur during the transition from the active mode to the one or more intermediate states; and restoring the state of the set of read only registers, wherein said restoring the state of the set of read-only registers comprises implementing a priority scheme for a status-event write operation and a software-restore write operation, and wherein the priority scheme is based on a functionality of the set of read-only registers.

2. The method of transitioning between an active mode and a power-down mode of claim 1, wherein saving the state of the set of read-only registers comprises saving the state of a plurality of cache state registers when the plurality of cache state registers are to be powered off and an associated cache memory array remains powered up.

3. The method of transitioning between an active mode and a power-down mode of claim 1, wherein the processor-based system includes a cache module having a plurality of cache arrays and associated cache state registers, and the step of saving the state of the active mode further comprises:

performing at least one of saving the state of the cache state registers when the plurality of cache arrays remain powered up and a remainder of the cache module is powered off and flushing the cache arrays when the entire cache module is to be powered off.

4. The method of transitioning between an active mode and a power-down mode of claim 1, wherein responding to the first set of interrupt events comprises performing at least one of restarting the transition from the active mode to the power-down mode, restarting the transition from the active mode to the power-down mode after a predefined time interval, aborting the transition from the active mode to the power-down mode, and sending a wake-up signal to the processor-based system, upon serving the first set of interrupt events.

5. The method of transitioning between an active mode and a power-down mode of claim 4, wherein aborting the transition comprises aborting the transition to the power-down mode based on the occurrence of an interrupt event of the first set of interrupt events, wherein the interrupt event occurs during flushing out a plurality of pipelines of the processor-based system.

6. The method of transitioning between an active mode and a power-down mode of claim 4, wherein aborting the transition comprises aborting the transition to the power-down mode based on the occurrence of an interrupt event of the first set of interrupt events, wherein the interrupt event occurs during sending a power-down signal.

7. The method of transitioning between an active mode and a power-down mode of claim 1, further comprising:

flushing a plurality of pipelines of the processor-based system;

sending a power-down signal after the flushing of the plurality of pipelines, wherein the power-down signal is sent by a central processing unit (CPU) of the processor-based system to a power-control module of the processor-based system; and powering off the CPU of the processor-based system in response to the power-down signal.

8. The method of transitioning between an active mode and a power-down mode of claim 1, further comprising masking a second set of interrupt events from amongst the one or more interrupt events, wherein the second set of interrupt events occur during one of the transition from the one or more intermediate states to the power-down mode and the transition from the power-down mode to the active mode.

9. The method of transitioning between an active mode and a power-down mode of claim 1, wherein the transition between the active mode and the power-down mode comprises transition from the power-down mode to the active mode of the processor-based system.

10. The method of transitioning between an active mode and a power-down mode of claim 9, wherein the transition from the power-down mode to the active mode comprises:

detecting at least one wake-up event;

initiating a wake-up process;

restoring the processor-based system to reach the active mode; and unmasking a second set of interrupt events upon attaining the active mode.

11. The method of transitioning between an active mode and a power-down mode of claim 10, wherein the step of restoring the processor-based system comprises:

restoring the state of a set of first registers;

restoring the state of a set of read-only registers by sending a write-control signal to enable a software-restore write operation that restores the state of the set of read-only registers; and restoring the state of a plurality of cache state registers, wherein the plurality of cache state registers are powered off during the power-down mode and an associated cache memory array remains powered up.

12. A method of transitioning between an active mode and a power-down mode in a processor-based system through one or more intermediate states, comprising:

saving a state of the active mode;

detecting occurrence of one or more interrupt events during a transition between the active mode and the power-down mode;

responding to a first set of interrupt events from amongst the one or more interrupt events, wherein the first set of interrupt events occur during the transition from the active mode to the one or more intermediate states; and transitioning from the active mode to the power-down mode when a time during which the processor-based system has to remain in the power-down mode is greater than a break-even time, wherein the break-even time is a time for which the processor-based system remains in the power-down mode to save power.

* * * * *